US010260025B2

(12) United States Patent
Erickson et al.

(10) Patent No.: US 10,260,025 B2
(45) Date of Patent: Apr. 16, 2019

(54) USE OF ACTIVATOR COMPLEXES TO ENHANCE LOWER TEMPERATURE CLEANING IN ALKALINE PEROXIDE CLEANING SYSTEMS

(71) Applicant: ECOLAB USA INC., St. Paul, MN (US)

(72) Inventors: Anthony W. Erickson, Golden Valley, MN (US); Thomas R. Mohs, Eagan, MN (US); Peter J. Fernholz, Burnsville, MN (US); Robert J. Ryther, St. Paul, MN (US)

(73) Assignee: Ecolab USA Inc., St. Paul, MN (US)

( * ) Notice: Subject to any disclaimer, the term of this patent is extended or adjusted under 35 U.S.C. 154(b) by 97 days.

(21) Appl. No.: 14/973,102

(22) Filed: Dec. 17, 2015

(65) Prior Publication Data

US 2016/0102275 A1 Apr. 14, 2016

Related U.S. Application Data

(63) Continuation of application No. 12/539,246, filed on Aug. 11, 2009, now abandoned, which is a (Continued)

(51) Int. Cl.
*C11D 1/72* (2006.01)
*C11D 3/02* (2006.01)
(Continued)

(52) U.S. Cl.
CPC ............ *C11D 3/3942* (2013.01); *B08B 3/04* (2013.01); *B08B 5/023* (2013.01); *C11D 1/02* (2013.01); *C11D 1/12* (2013.01); *C11D 1/72* (2013.01); *C11D 1/722* (2013.01); *C11D 3/044* (2013.01); *C11D 3/3902* (2013.01); *C11D 3/3905* (2013.01); *C11D 3/3932* (2013.01); (Continued)

(58) Field of Classification Search
CPC .... C11D 1/02; C11D 1/12; C11D 1/72; C11D 1/722; C11D 3/044; C11D 3/3905; C11D 3/3942; B04B 3/04; B04B 5/023; B08B 3/04; B08B 5/023
USPC ....... 510/234, 238, 245, 372, 376, 505, 506, 510/509; 134/8, 22.13
See application file for complete search history.

(56) References Cited

U.S. PATENT DOCUMENTS 4,568,477 A 2/1986 Oakes
4,655,953 A 4/1987 Oakes
(Continued)

FOREIGN PATENT DOCUMENTS

EP 0145090 10/1987
EP 458397 * 11/1991
(Continued)

*Primary Examiner* — Gregory R Delcotto
(74) *Attorney, Agent, or Firm* — Merchant & Gould P.C.

(57) ABSTRACT

The present invention provides for the use of activator complexes to enhance lower temperature cleaning in alkaline peroxide cleaning systems. Compositions including at least one of an activator complex, an active oxygen source, and a source of alkalinity are applied to the surface to be cleaned at temperatures between about 5° C. and about 50° C. The methods and compositions of the present invention provide for enhanced soil removal with reduced energy, water, and chemistry consumption.

16 Claims, 5 Drawing Sheets

Related U.S. Application Data continuation-in-part of application No. 12/369,417, filed on Feb. 11, 2009, now abandoned.

(60) Provisional application No. 61/027,605, filed on Feb. 11, 2008.

(51) Int. Cl.

| | | |
|---|---|---|
| C11D 3/04 | (2006.01) | |
| C11D 3/395 | (2006.01) | |
| B08B 3/04 | (2006.01) | |
| B08B 3/08 | (2006.01) | |
| B08B 9/027 | (2006.01) | |
| B08B 9/08 | (2006.01) | |
| C11D 3/39 | (2006.01) | |
| C11D 1/722 | (2006.01) | |
| C11D 1/12 | (2006.01) | |
| B08B 5/02 | (2006.01) | |
| C11D 1/02 | (2006.01) | |
| C23G 1/19 | (2006.01) | |

(52) U.S. Cl.
CPC ............... *C11D 3/3947* (2013.01); *C23G 1/19* (2013.01); *B01D 2321/168* (2013.01)

(56) References Cited

U.S. PATENT DOCUMENTS

| | | | | |
|---|---|---|---|---|
| 4,728,455 A * | 3/1988 | Rerek | ............... | C11D 3/3932 |
| | | | | 252/186.26 |
| 4,740,308 A | 4/1988 | Fremont et al. | | |
| 5,250,272 A | 10/1993 | Knorre et al. | | |
| 5,356,554 A | 10/1994 | Delwel et al. | | |
| 5,567,444 A * | 10/1996 | Hei | ............... | A61L 2/202 |
| | | | | 134/2 |
| 5,601,750 A | 2/1997 | Domke et al. | | |
| 5,770,555 A * | 6/1998 | Weinstein | ............... | C11D 3/044 |
| | | | | 510/218 |
| 5,783,542 A * | 7/1998 | Rouillard | ............... | C11D 3/3765 |
| | | | | 510/234 |
| 6,250,078 B1 | 6/2001 | Amendola et al. | | |
| 6,306,808 B1 | 10/2001 | Hazenkamp | | |
| 6,306,817 B1 | 10/2001 | Kott et al. | | |
| 6,358,905 B1 | 3/2002 | Render et al. | | |
| 6,528,470 B1 | 3/2003 | Ha et al. | | |
| 6,593,285 B1 | 7/2003 | Scheibel et al. | | |
| 6,689,737 B2 | 2/2004 | Schiebel | | |
| 6,727,215 B2 * | 4/2004 | Roberts | ............... | B65D 75/38 |
| | | | | 424/400 |
| 6,973,154 B2 | 12/2005 | Nagase et al. | | |
| 7,022,297 B2 | 4/2006 | Stewart | | |
| 7,161,005 B2 | 1/2007 | Schlingloff et al. | | |
| 7,166,566 B2 | 1/2007 | Mangin et al. | | |
| 7,737,101 B2 | 6/2010 | Thonhauser et al. | | |
| 9,127,235 B2 * | 9/2015 | Silvernail | ............... | C11D 3/044 |
| 9,677,031 B2 * | 6/2017 | Cabanas | ............... | C11D 3/0073 |
| 2002/0032143 A1 | 3/2002 | Wei et al. | | |
| 2003/0095918 A1 | 5/2003 | Nagano et al. | | |
| 2003/0148906 A1 | 8/2003 | Alam et al. | | |
| 2004/0048762 A1 | 3/2004 | Stewart | | |
| 2004/0234923 A1 | 11/2004 | Larsen et al. | | |
| 2005/0003992 A1 | 1/2005 | Del Duca et al. | | |
| 2005/0020466 A1 * | 1/2005 | Man | ............... | C11D 3/38663 |
| | | | | 510/392 |
| 2005/0069503 A1 | 3/2005 | Larsen et al. | | |
| 2005/0074722 A1 | 4/2005 | Larsen et al. | | |
| 2005/0085403 A1 | 4/2005 | Larsen et al. | | |
| 2005/0124519 A1 | 6/2005 | Sherry et al. | | |
| 2005/0148482 A1 | 7/2005 | Birker et al. | | |
| 2005/0164897 A1 | 7/2005 | Speed et al. | | |
| 2006/0042665 A1 * | 3/2006 | Fernholz | ............... | A01J 7/022 |
| | | | | 134/42 |
| 2006/0046945 A1 * | 3/2006 | Herdt | ............... | A01J 7/022 |
| | | | | 510/234 |
| 2006/0089295 A1 * | 4/2006 | Boehme | ............... | C11D 1/72 |
| | | | | 510/521 |
| 2006/0094622 A1 | 5/2006 | Fisher et al. | | |
| 2006/0112972 A1 * | 6/2006 | Peitersen | ............... | C11D 1/345 |
| | | | | 134/26 |
| 2006/0113506 A1 * | 6/2006 | Man | ............... | A01N 37/16 |
| | | | | 252/186.1 |
| 2006/0160712 A1 * | 7/2006 | Hei | ............... | A01N 25/02 |
| | | | | 510/111 |
| 2006/0229226 A1 | 10/2006 | Giniger et al. | | |
| 2006/0276339 A1 | 12/2006 | Windsor et al. | | |
| 2006/0287209 A1 | 12/2006 | Chaigne et al. | | |
| 2008/0045433 A1 | 2/2008 | Blagg et al. | | |
| 2008/0105279 A1 | 5/2008 | Herdt et al. | | |
| 2008/0105282 A1 * | 5/2008 | Fernholz | ............... | A01J 7/022 |
| | | | | 134/26 |
| 2008/0121250 A1 | 5/2008 | Fernholz et al. | | |
| 2009/0048141 A1 | 2/2009 | Spadoni et al. | | |
| 2009/0196939 A1 * | 8/2009 | Hei | ............... | A01N 25/02 |
| | | | | 424/616 |
| 2009/0200234 A1 | 8/2009 | Schacht et al. | | |
| 2010/0236581 A1 * | 9/2010 | Fernholz | ............... | A01J 7/022 |
| | | | | 134/26 |
| 2010/0240765 A1 * | 9/2010 | Lange | ............... | A23B 4/20 |
| | | | | 514/667 |
| 2012/0283165 A1 * | 11/2012 | Man | ............... | A01N 37/16 |
| | | | | 510/491 |

FOREIGN PATENT DOCUMENTS

| | | |
|---|---|---|
| EP | 0544490 | 6/1993 |
| EP | 0754218 | 9/1998 |
| EP | 0808212 | 4/1999 |
| EP | 0971028 | 1/2000 |
| EP | 0979863 | 2/2000 |
| EP | 0999261 | 5/2000 |
| EP | 0999262 | 5/2000 |
| EP | 1072674 | 1/2001 |
| EP | 1072716 | 1/2001 |
| EP | 1035197 | 6/2002 |
| EP | 0973855 | 8/2003 |
| EP | 1035198 | 8/2008 |
| GB | 2233662 | 1/1991 |
| WO | WO 1990/005243 | 5/1990 |
| WO | WO 1996/006154 | 2/1996 |
| WO | WO 98/39406 | 9/1998 |
| WO | WO 1998/039406 | 9/1998 |
| WO | WO 1999/005243 | 2/1999 |
| WO | WO 1999/015256 | 4/1999 |
| WO | WO 1999/020722 | 4/1999 |
| WO | WO 1999/064554 | 12/1999 |
| WO | WO 2005/005028 | 1/2005 |
| WO | WO 2005/068074 | 7/2005 |
| WO | WO 2006/010889 | 2/2006 |
| WO | WO 2006/012691 | 2/2006 |

* cited by examiner

Test coupons after cleaning
Left: Comparative Formula 1
Right: Formula A

Test coupons before cleaning

USE OF ACTIVATOR COMPLEXES TO ENHANCE LOWER TEMPERATURE CLEANING IN ALKALINE PEROXIDE CLEANING SYSTEMS

CROSS REFERENCE TO RELATED APPLICATIONS

This application is a continuation of U.S. patent application Ser. No. 12/539,246 filed on Aug. 11, 2009, now abandoned, which is a continuation in part of U.S. patent application Ser. No. 12/369,417, filed on Feb. 11, 2009, now abandoned. U.S. patent application Ser. No. 12/369,417 claims priority to U.S. Provisional Patent Application No. 61/027,605, entitled "Methods for Cleaning Surfaces with Activated Oxygen," filed on Feb. 11, 2008. The entire contents of these patent applications are hereby expressly incorporated herein by reference including, without limitation, the specification, claims, and abstract, as well as any figures, tables, or drawings thereof.

FIELD OF THE INVENTION

The present disclosure relates to methods and compositions for removing soils from hard surfaces by generating a gas on and in the soil, at reduced temperatures.

BACKGROUND

In many industrial applications, such as the manufacture of foods and beverages, hard surfaces commonly become contaminated with soils such as carbohydrate, proteinaceous, and hardness soils, food oil soils, fat soils, and other soils. Such soils can arise from the manufacture of both liquid and solid foodstuffs. Carbohydrate soils, such as cellulosics, monosaccharides, disaccharides, oligosaccharides, starches, gums and other complex materials, when dried, can form tough, hard to remove soils, particularly when combined with other soil components such as proteins, fats, oils, minerals, and others. The removal of such carbohydrate soils can be a significant problem. Similarly, other materials such as proteins, fats and oils can also form hard to remove soil and residues.

Food and beverage soils are particularly tenacious when they are heated during processing. Foods and beverages are heated for a variety of reasons during processing. For example, in dairy plants, dairy products are heated on a pasteurizer (e.g. HTST—high temperature short time pasteurizer or UHT—ultra high temperature pasteurizer) in order to pasteurize the dairy product. Also, many food and beverage products are concentrated or created as a result of evaporation.

Clean in place (CIP) cleaning techniques are a specific cleaning regimen adapted for removing soils from the internal components of tanks, lines, pumps and other process equipment used for processing typically liquid product streams such as beverages, milk, juices, etc. Clean in place cleaning involves passing cleaning solutions through the system without dismantling any system components. The minimum clean-in-place technique involves passing the cleaning solution through the equipment and then resuming normal processing. Any product contaminated by cleaner residue can be discarded.

Often clean in place methods involve a first rinse, the application of the cleaning solutions, and a second rinse with potable water followed by resumed operations. The process can also include any other contacting step in which a rinse, acidic or basic functional fluid, solvent or other cleaning component such as hot water, cold water, etc. can be contacted with the equipment at any step during the process. Often the final potable water rinse is skipped in order to prevent contamination of the equipment with bacteria following the cleaning and/or sanitizing step. Conventional clean in place methods require high temperatures, e.g., above about 80° C. Thus, conventional clean in place techniques require the consumption of large amounts of energy and water.

What is needed therefore is an improved low temperature method for removing soils that are not easily removed using conventional cleaning techniques. It is against this background that the present invention has been made.

SUMMARY OF THE INVENTION

In some aspects, the present invention relates to a method for removing soil from a surface using a clean in place process. The method includes applying to the surface a composition including: (i) an activator complex; (ii) a source of alkalinity; and (iii) an active oxygen source. The composition is applied to the surface at a temperature of between about 5° C. and about 50° C.

In some embodiments, the activator complex comprises a transition metal complex. In other embodiments, the transition metal complex comprises a source of manganese ions. The source of manganese ions has an oxidation state selected from the group consisting of zero, two, three, four, seven and combinations thereof, in some embodiments. In other embodiments, the source of manganese ions is selected from the group consisting of manganese (II) sulfate, manganese (II) chloride, manganese (II) oxide, manganese (III) oxide, manganese (IV) oxide, manganese (II) acetate and mixtures thereof.

In other embodiments, the source of manganese ions is complexed with a gluconate composition. The source of alkalinity can be selected from the group consisting of basic salts, amines, alkanol amines, carbonates, silicates and mixtures thereof. In some embodiments, the source of alkalinity comprises an alkali metal hydroxide. In other embodiments, the source of alkalinity comprises sodium hydroxide. In some embodiments, the pH of the composition is about 10 to about 14.

In some embodiments, the surface to be cleaned is selected from the group consisting of tanks, lines and processing equipment. In some embodiments, the processing equipment is selected from the group consisting of a pasteurizer, a homogenizer, a separator, an evaporator, a filter, a dryer, a membrane, a fermentation tank, a cooling tank, and combinations thereof.

In some embodiments, the composition is applied to the surface to be cleaned for between about 10 minutes and about 60 minutes. In other embodiments, the composition substantially degrades upon contact with a soil present on the surface to be cleaned.

In other embodiments, the composition comprises: (i) about 50 to about 200 parts per million activator complex; (ii) about 0.25 wt % to about 1.5 wt % of the source of alkalinity; and (iii) about 0.25 wt % to about 1.0 wt % active oxygen source. In other embodiments, the composition further comprises an additional functional ingredient selected from the group consisting of a low foam surfactant, a builder, a buffer, an antimicrobial composition, and combinations thereof.

In some embodiments, the surfactant is selected from the group consisting of alcohol alkoxylates, linear alkyl benzene sulfonates, alcohol sulfonates amine oxides, alkyl phenol ethoxylates, polyethylene glycol esters, EO/PO block copolymers and mixtures thereof. In other embodiments, the composition comprises GRAS ingredients.

In other embodiments, the method of the present invention further comprises reapplying the composition after it has been applied to the surface to be cleaned, wherein an additional unused active oxygen source is added to reapplied composition. In some embodiments, the additional active oxygen source is added to the composition before the composition is reapplied to the surface. In other embodiments, the additional active oxygen source is added to the composition substantially simultaneous with the reapplication of the composition to the surface. In still yet other embodiments, the additional active oxygen source is added to the composition after the composition is reapplied to the surface.

In some aspects, the present invention relates to a method for cleaning a surface. The method comprises applying a pre-treatment solution to the surface for an amount of time sufficient to substantially penetrate a soil on the surface; and then applying an override solution to the surface, wherein there is no rinse step between the application of the pre-treatment solution, and the override solution. In some embodiments, the pre-treatment solution comprises an active oxygen source, and a source of alkalinity, and the override solution comprises an activator complex. In other embodiments, the pre-treatment solution comprises an activator complex, and a source of alkalinity, and the override solution comprises an active oxygen source. In still yet other embodiments, the pre-treatment solution comprises an active oxygen source, and an activator complex, and the override solution comprises a source of alkalinity.

In some aspects, the present invention provides for aqueous compositions for use in removing soil from a surface using a clean in place process. The compositions comprise: (a) an activator complex; (b) a source of alkalinity; and (c) an active oxygen source. In some embodiments, the activator complex comprises a transition metal complex. In other embodiments, the transition metal complex comprises a source of manganese ions. The source of manganese ions has an oxidation state selected from the group consisting of zero, two, three, four, seven and combinations thereof, in some embodiments.

In other embodiments, the source of manganese ions is selected from the group consisting of manganese (II) sulfate, manganese (II) chloride, manganese (II) oxide, manganese (III) oxide, manganese (IV) oxide, manganese (II) acetate, manganese gluconate, manganese nitrate and mixtures thereof. In still yet other embodiments, the source of manganese ions is complexed with a gluconate salt.

In other embodiments, the composition comprises a molar excess of gluconate salt to the source of manganese ions. In still yet other embodiments, the source of alkalinity is selected from the group consisting of basic salts, amines, alkanol amines, carbonates, silicates and mixtures thereof. In some embodiments, the source of alkalinity comprises an alkali metal hydroxide. In other embodiments, the source of alkalinity comprises sodium hydroxide.

In some embodiments, the active oxygen source comprises a peroxygen compound. The peroxygen compound comprises hydrogen peroxide in some embodiments. In other embodiments, the pH of the compositions is about 11 to about 14.

In other embodiments, the compositions comprise: (i) about 10 to about 500 parts per million activator complex; (ii) about 0.25 wt % to about 1.5 wt % of the source of alkalinity; and (iii) about 0.25 wt % to about 1.0 wt % active oxygen source. In some embodiments, the compositions further comprise an additional functional ingredient selected from the group consisting of a low foam surfactant, a builder, a buffer, an antimicrobial composition, and combinations thereof.

In some embodiments, the surfactant is selected from the group consisting of alcohol alkoxylates, linear alkyl benzene sulfonates, alcohol sulfonates amine oxides, alkyl phenol ethoxylates, polyethylene glycol esters, EO/PO block copolymers and mixtures thereof.

In some aspects, the present invention provides a two-part aqueous cleaning composition comprising: (a) an aqueous pre-treatment solution; and (b) an aqueous override solution. The aqueous pre-treatment solution comprises: (i) an activator complex; (ii) a builder; (iii) a chelating agent; and (iv) a source of alkalinity. The aqueous override solution comprises: (i) an active oxygen source; and (ii) a surfactant.

In some embodiments, the pretreatment composition has a pH of about 8 to about 13. In other embodiments, the override composition further comprises an additional ingredient selected from the group consisting of a chelating agent, a hydrotrope, a builder, and combinations thereof.

In other embodiments, the pretreatment compositions comprise: (i) about 0.1 wt % to about 10 wt % of the activator complex; (ii) about 1 wt % to about 10 wt % of the builder; (iii) about 1 wt % to about 5 wt % of the chelating agent; and (iv) about 10 wt % to about 30 wt % of the source of alkalinity. In other embodiments, the override composition comprises: (i) about 10 wt % to about 30 wt % of the active oxygen source; and (ii) about 1 wt % to about 5 wt % of the surfactant. In some embodiments, the pretreatment composition can be reused.

DETAILED DESCRIPTION

Figure 1:
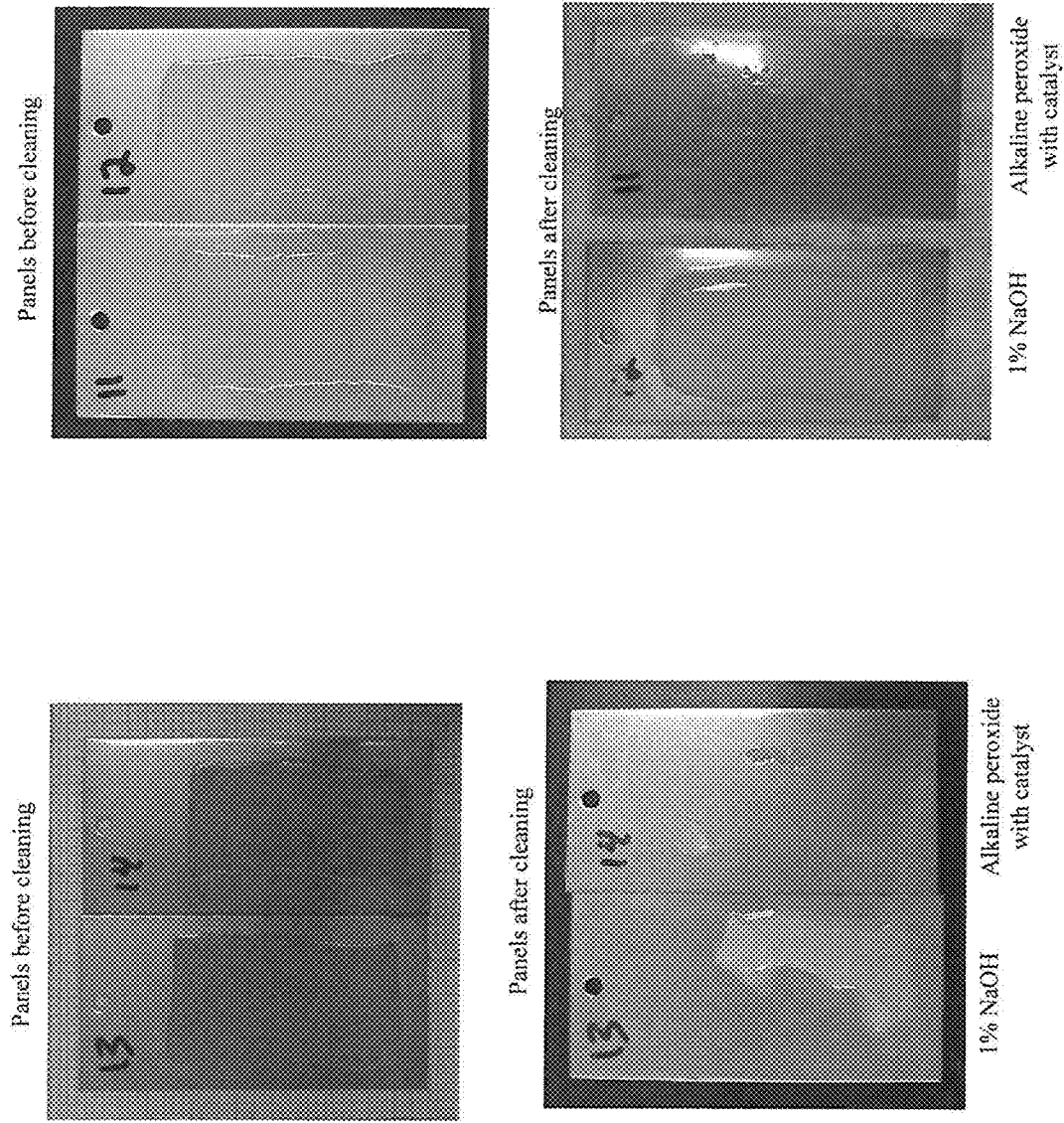
FIG. 1 is a photograph illustrating stainless steel panels before and after cleaning as described in Example 1.

In some aspects, the present invention provides methods and compositions for removing soils from a hard surface. In some embodiments, the methods and compositions may be used in a clean in place process. The methods include applying a composition including at least one of an activator complex, a source of alkalinity and an active oxygen source to the surface to be cleaned.

In some embodiments, the compositions of the invention have an alkaline pH, e.g., a pH of about 10 to about 14. The cleaning methods and compositions may be used at lower temperatures than those used in conventional cleaning methods. Without wishing to be bound by any particular theory, it is thought that the use of the selected activator complexes allows for the lowering of the cleaning temperature. It is thought that the activator complexes act as a catalyst for the active oxygen source to produce oxygen gas at lower temperatures than those temperatures at which the active oxygen source conventionally degrades to produce oxygen gas. In some embodiments, the use of an activator complex in combination with an active oxygen source allows for the production of oxygen gas in situ on and in a soil, and/or in solution. It is thought that the mechanical action of the oxygen gas generation aids in breaking up soils present on the contacted surfaces.

In some embodiments, the use of an activator complex in the methods of the present invention allows for the use of reduced levels of chemistry, e.g., an alkaline source and/or an active oxygen source, during cleaning. Thus, the methods of the present invention provide for reduced energy consumption, e.g., lower cleaning temperatures, and reduced chemical consumption.

The activator complexes for use in the present invention are designed and formulated such that they are stable, i.e., remain in solution, in highly alkaline aqueous solutions, e.g., a solution including about 5% to about 50% sodium hydroxide.

In some embodiments, the methods and compositions are also formulated to cause a reduction in oxidation state of a transition metal included in the selected activator complex. For example, when manganese is included in the activator complex, in some embodiments, the compositions are formulated to initiate the reduction of Mn(IV) to Mn(III). Without wishing to be bound by any particular theory, it is thought that this reduction triggers the distortion and degeneration of the activator complex, producing an active catalytic manganese species for use in decomposing an active oxygen source, e.g., hydrogen peroxide, and/or peracids.

To prevent the decomposition of the activator complex to an inactive form, e.g., manganese dioxide or other inactive forms, the compositions of the present invention may include builders and/or additional chelating agents. Builders and/or chelating agents may be used to keep an active form on the activator complex in solution/suspension. This aids in providing suitable activity for reuse of the solutions as well.

In some embodiments, the compositions of the present invention are formulated such that they may be reused, e.g., reused in additional cleaning processes. For example, in some embodiments, after a first cleaning process, the used composition is recovered. The used composition may be reused, and reactivated by the addition of an unused active oxygen source. In some embodiments, the compositions of the present invention may be recirculated in a CIP process for about 3 to about 10 days. In other embodiments, the compositions of the present invention may be recirculated in a CIP process for about 7 days.

So that the invention maybe more readily understood, certain terms are first defined.

As used herein, "weight percent," "wt-%," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt-%," etc.

As used herein, the term "about" refers to variation in the numerical quantity that may occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

As used herein, the term "cleaning" refers to a method or process used to facilitate or aid in soil removal, bleaching, microbial population reduction, and any combination thereof.

The methods, and compositions of the present invention can include, consist essentially of, or consist of the steps, and ingredients of the present invention as well as other ingredients described herein. As used herein, "consisting essentially of" means that the methods, and compositions may include additional steps, or ingredients, but only if the additional steps, or ingredients do not materially alter the basic and novel characteristics of the claimed methods, and compositions.

In some aspects, the methods and compositions of the present invention may be applied to equipment generally cleaned using clean in place cleaning procedures. Examples of such equipment include evaporators, heat exchangers (including tube-in-tube exchangers, direct steam injection, and plate-in-frame exchangers), heating coils (including steam, flame or heat transfer fluid heated) re-crystallizers, pan crystallizers, spray dryers, drum dryers, and tanks.

The methods and compositions of the present invention may be used in any application where thermally degraded soils, i.e., caked on soils or burned on soils, such as proteins or carbohydrates, need to be removed. As used herein, the term "thermally degraded soil" refers to a soil or soils that have been exposed to heat and as a result have become baked on to the surface to be cleaned. Exemplary thermally degraded soils include food soils that have been heated during processing, e.g., dairy products heated on pasteurizers, fructose, or corn syrup.

The methods and compositions of the present invention may also be used to remove other non-thermally degraded soils that are not easily removed using conventional cleaning techniques. Soil types suited to cleaning with the methods of the present invention include, but are not limited to, starch, cellulosic fiber, protein, simple carbohydrates and combinations of any of these soil types with mineral complexes. Examples of specific food soils that are effectively removed using the methods of the present invention include, but are not limited to, vegetable and fruit juices, brewing and fermentation residues, soils generated in sugar beet and cane processing, and soils generated in condiment and sauce manufacture, e.g., ketchup, tomato sauce, barbeque sauce. These soils can develop on heat exchange equipment surfaces and on other surfaces during the manufacturing and packaging process.

Exemplary industries in which the methods and compositions of the present invention can be used include, but are not limited to: the food and beverage industry, e.g., the dairy, cheese, sugar, and brewery industries; oil processing industry; industrial agriculture and ethanol processing; and the pharmaceutical manufacturing industry.

Conventional CIP processing is generally well-known. The process includes applying a dilute solution (typically about 0.5-3%) onto the surface to be cleaned. The solution flows across the surface (3 to 6 feet/second), slowly removing the soil. Either new solution is re-applied to the surface, or the same solution is recirculated and re-applied to the surface.

A typical CIP process to remove a soil (including organic, inorganic or a mixture of the two components) includes at least three steps: an alkaline solution wash, an acid solution wash, and then a fresh water rinse. The alkaline solution softens the soils and removes the organic alkaline soluble soils. The subsequent acid solution removes mineral soils left behind by the alkaline cleaning step. The strength of the alkaline and acid solutions and the duration of the cleaning steps are typically dependent on the durability of the soil. The water rinse removes any residual solution and soils, and cleans the surface prior to the equipment being returned on-line.

Unlike conventional CIP techniques, the methods and compositions of the present invention provide for enhanced soil removal at reduced temperatures, e.g., 10° C. to 50° C. The present invention also provides for a reduction in the amount of chemistry and water consumed during the cleaning process. Thus, the present invention provides both energy and water savings, while achieving effective soil removal.

Compositions

In some aspects, the present invention includes compositions suitable for use in low temperature, e.g., about 10° C. to about 50° C., cleaning applications, e.g., CIP cleaning applications. The compositions include at least one of an activator complex, a source of alkalinity and an active oxygen source. In some embodiments, the compositions for use with the methods of the present invention are at an alkaline pH, e.g., about 11 to about 14. In some embodiments, all three components may be applied to the surface to be cleaned as part of one composition. In other embodiments, the activator complex and the source of alkalinity may be applied to the surface as part of one composition and the active oxygen source may be applied as part of another separate composition. In still yet other embodiments, the active oxygen source and the activator complex may be applied to the surface as part of one composition, and the source of alkalinity may be applied to the surface as part of another separate composition. The activator complex, the source of alkalinity and the active oxygen source may be applied in any combination, and in any stepwise order, to the surface to be cleaned.

Activator Complex

In some aspects, the present invention provides an aqueous composition including an activator complex. As used herein the term "activator complex" or "activation complex" refers to a composition capable of reacting with an active oxygen source and/or a soil to enhance production of oxygen gas in situ on and in the soil. Without wishing to be bound by any particular theory, it is thought that the activator complex acts as a catalyst for oxygen gas generation during cleaning. That is, it is thought that the activator complex degrades an active oxygen source to generate oxygen gas in situ on and in the soil, during cleaning, without being degraded itself.

Activator complexes for use in the present invention include, but are not limited to, transition metal complexes. The activator complex, or complexes, selected is dependent on a variety of factors including, for example, the active oxygen source selected, the surface to be cleaned, and the amount and type of soil to be removed.

In some embodiments, the activator complex includes a transition metal complex. As used herein the term "transition metal complex" refers to a composition including a transition metal, i.e., any element contained within the d-block on the periodic table, i.e., groups 3 through 12 on the periodic table. Exemplary transition metals suitable for use in the methods of the present invention include, but are not limited to, manganese, molybdenum, chromium, copper, iron, cobalt and mixtures and derivatives thereof. In some embodiments, the metal included in the activator complex is not iron.

In some embodiments, the activator complex includes a source of manganese ions. The source of manganese ions can have an oxidation state of +2, +3, +4, +6 or +7. In other embodiments, the source of manganese ions has an oxidation state of +2, +3, +4, or +7. Exemplary sources of manganese ions include, but are not limited to, manganese (II) sulfate, manganese (II) chloride, manganese (II) oxide, manganese (III) oxide, manganese (IV) oxide, manganese (II) acetate, manganese gluconate, manganese nitrate and combinations thereof. Other exemplary sources of manganese ions suitable for use in the methods of the present invention include those described in European Patent Nos. 0458397, 0458398, and 0549271, as well as those described in U.S. Pat. No. 5,246,621. The entire contents of each of these patents are hereby incorporated by reference. Manganese ion sources that are generally recognized as safe (GRAS) for direct food contact may be used with the methods of the present invention.

In some embodiments, a source of oxygen is added to the compositions of the present invention to facilitate oxidation of the activator complex. For example, in some embodiments, an oxygen source is provided to facilitate oxidation of Mn(II) to Mn(III) and/or Mn(IV). The source of oxygen may be provided in a variety of forms. For example, the compositions of the present invention may be stirred vigorously in air, or oxygen may be bubbled into the compositions. In some embodiments, an active oxygen source, e.g., hydrogen peroxide, hypochlorite and/or peracids, may be added to the compositions to oxidize the activator complex.

The activator complex may be present in any form suitable for use with the methods of the present invention. For example, in some embodiments the activator complex is included as part of an aqueous solution applied to the surface. The activator complex may also be used in the form of a solid. For example, in some embodiments, the activator complex includes a solid block of a transition metal complex. A solution, e.g., a solution including an active oxygen source, may be run, e.g., poured, or sprayed, over the block. As the solution washes over the block, the transition metal complex in the block activates the active oxygen source in the solution. The resulting activated solution may then be applied the selected surface. For example, the resulting activated solution may be used in a CIP process to clean a surface.

In some embodiments, the activator complex may be delivered to the surface to be cleaned as part of the source of alkalinity. For example, the activator complex may be formulated such that it is a component of the alkaline solution. In some embodiments, when delivered in a composition also including a source of alkalinity, the activator complex is an alkaline stable transition metal complex. As used herein the term "alkaline stable transition metal complex" refers to a complex including a transition metal that does not substantially degrade under alkaline conditions.

In some embodiments, the alkaline stable transition metal complex includes a transition metal, e.g., a source of manganese ions, and an alkaline stable complexing agent. Exemplary sources of manganese ions for use in preparing an alkaline stable transition metal complex include, but are not limited to, manganese (II) sulfate, manganese (II) chloride, manganese (II) oxide, manganese (III) oxide, manganese (IV) oxide, manganese (II) acetate, manganese gluconate, manganese nitrate and combinations thereof. Exemplary alkaline stable complexing agents include, but are not limited to sodium gluconate, sorbitol, mannitol, tartrate, sucrose, erythritol, inositol and combinations thereof.

Additional methods for enhancing the alkaline stability of an activator complex include, but are not limited to, encapsulating the activator complex.

Without wishing to be bound by any particular theory, it is thought that the activator complexes facilitate and enhance the ability of the compositions to clean surfaces at reduced temperatures, e.g., between about 10° C. and about 50° C. That is, the use of an activator complex allows for oxygen gas production on and in the soil to be removed without the use of high heat. Further, the activator complex aids in the production of oxygen gas at an alkaline pH.

Such oxygen production aids in facilitating soil removal by generating mechanical action on and in the soil, in addition to the normal bleaching and cleaning action of an oxygen producing source. It is thought that the active oxygen source penetrates the soil. When the active oxygen source within the soil is contacted by the activator complex, oxygen gas is produced within the soil. As the oxygen gas is being produced, it breaks up the soil from within. As an aqueous solution is passed over or through the surface, the broken up soil is washed away.

Without wishing to be bound by any particular theory, it is thought that compositions including activator complexes and active oxygen sources are also activated upon contact with a soil. That is, although some bubbling and gas generation may occur when an activator complex contacts an active oxygen source, when the compositions including an activator complex and an active oxygen source contact a soil the amount of bubbling and oxygen gas generated substantially increases. This increased gas generation upon contact with a soil may be due in part to the soil providing nucleation sites for the active oxygen source and/or the activator complex. It may also be due to the presence of electrons in the soil, which may cause the activator complex to act as a catalyst and recycle itself.

The amount of activator complex used in the methods of the present invention is dependent on a variety of factors including, the active oxygen source used, the type of surface to be cleaned, and the amount and type of soil present on the surface. The amount of activator complex used is also dependent on the size the particular activator complex chosen.

In some embodiments, the compositions of the present invention include about 0.0001 wt % to about 1.0 wt % of the activator complex. In other embodiments, the amount of activator complex present is about 0.1 wt % to about 5 wt % of the compositions of the present invention. Acceptable levels of activator complex include about 0.0005 wt % to about 0.002 wt %, or about 0.005 wt % to about 0.02 wt %; 0.01 wt % is a particularly suitable level.

In some embodiments, the amount of activator complex added may be such that the production of oxygen from the reaction between the activator complex and the active oxygen source is controlled over time. This is particularly desirable when cleaning surfaces using a clean in place method so as to not damage the surface or the equipment due to large amounts of oxygen gas production. In some embodiments, the concentration of the activator complex added is varied to provide a controlled release of oxygen gas on the surface to be cleaned.

In some embodiments, the reaction rate between the activator complex, and the active oxygen source, and/or the soil, may be controlled. Certain compounds and compositions may be used to increase the activity of the activator complex, e.g., increase the amount of oxygen gas generated. Exemplary promoters of the activator complex include, but are not limited to, silver, silver containing compounds, iron, and iron containing compounds.

Certain compounds and compositions may also be used to reduce the activity of the activator complex, e.g., decrease the amount of oxygen gas generated. Exemplary activity reducers include, for example, ethylenedinitrilotetraacetic acid (EDTA).

Active Oxygen Source

In some embodiments, the compositions of the present invention include an active oxygen source. As used herein, the term "active oxygen source," refers to any composition capable of generating oxygen gas in situ on and in a soil, as well as in solution. In some embodiments, the active oxygen source is a compound capable of providing oxygen gas in situ on and in the soil upon contact with an activator complex. The compound may be organic, or inorganic.

Exemplary active oxygen sources for use in the methods of the present invention include, but are not limited to, peroxygen compounds, bromates, iodates, permanganates, perborates, and gaseous oxidants such as ozone, oxygen, chlorine dioxide, sulfur dioxide and derivatives thereof. In some embodiments, the active oxygen source does not include a chlorine containing group. Without wishing to be bound by any particular theory, it is thought that reaction of the active oxygen source with the soil and/or the activator complex creates vigorous mechanical action on and within the soil due to the oxygen gas released. The mechanical action may break up the soil from within. It is thought that this mechanical action enhances removal of the soil beyond that caused by the chemical and bleaching action of the active oxygen source alone.

In some embodiments, the active oxygen source includes at least one peroxygen compound. Peroxygen compounds including, but not limited to, peroxides and various percarboxylic acids, including percarbonates, may be used in the methods of the present invention. Peroxycarboxylic (or percarboxylic) acids generally have the formula $R(CO_3H)_n$, where, for example, R is an alkyl, arylalkyl, cycloalkyl, aromatic, or heterocyclic group, and n is one, two, or three, and named by prefixing the parent acid with peroxy. The R group may be saturated or unsaturated as well as substituted or unsubstituted. Medium chain peroxycarboxylic (or percarboxylic) acids may have the formula $R(CO_3H)_n$, where R is a $C_5$-$C_{11}$ alkyl group, a $C_5$-$C_{11}$ cycloalkyl, a $C_5$-$C_{11}$ arylalkyl group, $C_5$-$C_{11}$ aryl group, or a $C_5$-$C_{11}$ heterocyclic group; and n is one, two, or three. Short chain perfatty acids may have the formula $R(CO_3H)_n$ where R is $C_1$-$C_4$ and n is one, two, or three.

Exemplary peroxycarboxylic acids for use with the present invention include, but are not limited to, peroxypentanoic, peroxyhexanoic, peroxyheptanoic, peroxyoctanoic, peroxynonanoic, peroxyisononanoic, peroxydecanoic, peroxyundecanoic, peroxydodecanoic, peroxyascorbic, peroxyadipic, peroxycitric, peroxypimelic, or peroxysuberic acid, and mixtures thereof.

Branched chain peroxycarboxylic acids include peroxyisopentanoic, peroxyisononanoic, peroxyisohexanoic, peroxyisoheptanoic, peroxyisooctanoic, peroxyisonananoic, peroxyisodecanoic, peroxyisoundecanoic, peroxyisododecanoic, peroxyneopentanoic, peroxyneohexanoic, peroxyneoheptanoic, peroxyneooctanoic, peroxyneononanoic, peroxyneodecanoic, peroxyneoundecanoic, peroxyneododecanoic, and mixtures thereof.

Additional exemplary peroxygen compounds for use with the methods of the present invention include hydrogen peroxide ($H_2O_2$), peracetic acid, peroctanoic acid, a persulphate, a perborate, or a percarbonate. In some embodiments, the active oxygen source includes hydrogen peroxide.

In some embodiments, compositions for use in the methods of the present invention include at least one active oxygen source. In other embodiments, compositions for use in the methods of the present invention include at least two, at least three, or at least four active oxygen sources. For example, combinations of active oxygen sources for use with the methods of the present invention may include, but are not limited to, peroxide/peracid combinations, or peracid/peracid combinations. In other embodiments, the active oxygen use source includes a peroxide/acid or a peracid/acid composition.

Active oxygen sources include commercially available active oxygen sources and/or active oxygen sources that may be generated on site. Active oxygen sources may also be generated in situ. That is, in some embodiments, active oxygen sources may be generated directly in the compositions of the present invention. For example, peroxidases and other enzymes, e.g., those found within peroxizomes, may be included in the compositions of the present invention. For example, D-amino oxidases such as glucose oxidase readily utilize oxygen to convert D-glucose into gluconic acid and hydrogen peroxide. In some embodiments of the present invention, enzymes capable of converting sugars in the system into hydrogen peroxide can be included. The hydrogen peroxide produced may then generate oxygen gas when contacted with the activator complex. In yet other embodiments, enzymes such as the superoxide dismutases may be used to convert the superoxide anion into hydrogen peroxide and oxygen.

The amount of active oxygen source present in the compositions of the present invention is dependent on a variety of factors including, for example, the type of surface to be cleaned, and the amount and type of soil present on the surface. In some embodiments, the amount of active oxygen source present is between about 0.05 wt % and about 5 wt %. Acceptable levels of active oxygen source present are about 0.05 wt % to about 0.25 wt %, or about 0.25 wt % to about 1.0 wt %; about 0.15 w-% is a particularly suitable level.

Alkalinity Source

In some aspects, the compositions of the present invention include a source of alkalinity. In other embodiments, an alkalinity source is included in an override solution that is applied to the surface after the compositions of the present invention have been applied to the surface. Exemplary alkaline sources suitable for use with the present invention include, but are not limited to, basic salts, amines, alkanol amines, carbonates and silicates. Other exemplary alkaline sources for use with the methods of the present invention include NaOH (sodium hydroxide), KOH (potassium hydroxide), TEA (triethanol amine), DEA (diethanol amine), MEA (monoethanolamine), sodium carbonate, and morpholine, sodium metasilicate and potassium silicate. The alkaline source selected may be compatible with the surface to be cleaned.

The amount of alkaline source present is dependent on a variety of factors including, for example, the type of surface to be cleaned, and the amount and type of soil present on the surface. In some embodiments, the amount of alkaline source present is about 0.05 wt % to about 10 wt %. Suitable levels of alkaline include about 0.05 to about 1.5 wt % and about 0.75 to about 1.0 wt %.

Additional Ingredients

In some embodiments, the compositions of the present invention include additional ingredients. Additional ingredients may also be present in an override solution used with the compositions of the present invention, e.g., applied to the surface to be cleaned after the compositions of the present invention are applied to the surface. In some embodiments, the additional ingredients may facilitate soil removal from the surface to be cleaned. Additional ingredients for use with the methods of the present invention include, for example, penetrants, surfactants, builders, antimicrobial agents and buffers.

Penetrants

In some aspects, a penetrant may be used with the methods of the present invention. The penetrant may be combined with an alkaline source in the cleaning composition, or, the penetrant may be used without an alkaline source. In some embodiments, the penetrant is water miscible.

Examples of suitable penetrants include, but are not limited to, alcohols, short chain ethoxylated alcohols and phenol (having 1-6 ethoxylate groups). Organic solvents are also suitable penetrants. Examples of suitable organic solvents, for use as a penetrant, include esters, ethers, ketones, amines, and nitrated and chlorinated hydrocarbons.

Ethoxylated alcohols are also suitable for use with the methods of the present invention. Examples of ethoxylated alcohols include, but are not limited to, alky, aryl, and alkylaryl alkloxylates. These alkloxylates may be further modified by capping with chlorine-, bromine-, benzyl-, methyl-, ethyl-, propyl-, butyl- and alkyl-groups. Ethoxylated alcohols may be present in the cleaning composition from about 0.1 wt % to about 20 wt %.

Fatty acids are also suitable for use as penetrants in the methods of the present invention. Some non-limiting examples of fatty acids are $C_6$ to $C_{12}$ straight or branched fatty acids. In some embodiments, fatty acids used in the methods of the present invention are liquid at room temperature.

In some embodiments, a penetrant for use in the methods of the present invention includes water soluble glycol ethers. Examples of glycol ethers include dipropylene glycol methyl ether (available under the trade designation DOWANOL DPM from Dow Chemical Co.), diethylene glycol methyl ether (available under the trade designation DOWANOL DM from Dow Chemical Co.), propylene glycol methyl ether (available under the trade designation DOWANOL PM from Dow Chemical Co.), and ethylene glycol monobutyl ether (available under the trade designation DOWANOL EB from Dow Chemical Co.). In some embodiments, a glycol ether is present in an amount of from about 1.0 wt % to about 20 wt %.

Surfactants

A surfactant or mixture of surfactants may be used in the methods of the present invention. The surfactant chosen may be compatible with the surface to be cleaned. A variety of surfactants may be used, including anionic, nonionic, cationic, and zwitterionic surfactants, which are commercially available from a number of sources. Suitable surfactants include nonionic surfactants, for example, low foaming non-ionic surfactants. For a discussion of surfactants, see Kirk-Othmer, *Encyclopedia of Chemical Technology*, Third Edition, volume 8, pages 900-912.

Nonionic surfactants suitable for use in the methods of the present invention include, but are not limited to, those having a polyalkylene oxide polymer as a portion of the surfactant molecule. Exemplary nonionic surfactants include, but are not limited to, chlorine-, benzyl-, methyl-, ethyl-, propyl-, butyl- and other like alkyl-capped polyethylene and/or polypropylene glycol ethers of fatty alcohols; polyalkylene oxide free nonionics such as alkyl polyglycosides; sorbitan and sucrose esters and their ethoxylates; alkoxylated ethylene diamine; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and ethoxylated amines and ether amines commercially available from Tomah Corporation and other like nonionic compounds. Silicone surfactants such as the ABIL B8852 (Goldschmidt) may also be used.

Additional exemplary nonionic surfactants suitable for use in the methods of the present invention, include, but are not limited to, those having a polyalkylene oxide polymer portion include nonionic surfactants of C6-C24 alcohol ethoxylates (e.g., C6-C14 alcohol ethoxylates) having 1 to about 20 ethylene oxide groups (e.g., about 9 to about 20 ethylene oxide groups); C6-C24 alkylphenol ethoxylates (e.g., C8-C10 alkylphenol ethoxylates) having 1 to about 100 ethylene oxide groups (e.g., about 12 to about 20 ethylene oxide groups); C6-C24 alkylpolyglycosides (e.g., C6-C20 alkylpolyglycosides) having 1 to about 20 glycoside groups (e.g., about 9 to about 20 glycoside groups); C6-C24 fatty acid ester ethoxylates, propoxylates or glycerides; and C4-C24 mono or dialkanolamides.

Exemplary alcohol alkoxylates include, but are not limited to, alcohol ethoxylate propoxylates, alcohol propoxylates, alcohol propoxylate ethoxylate propoxylates, alcohol ethoxylate butoxylates; nonylphenol ethoxylate, polyoxyethylene glycol ethers; and polyalkylene oxide block copolymers including an ethylene oxide/propylene oxide block copolymer such as those commercially available under the trademark PLURONIC (BASF-Wyandotte).

Examples of suitable low foaming nonionic surfactants also include, but are not limited to, secondary ethoxylates, such as those sold under the trade name TERGITOL™, such as TERGITOL™ 15-S-7 (Union Carbide), Tergitol 15-S-3, Tergitol 15-S-9 and the like. Other suitable classes of low foaming nonionic surfactants include alkyl or benzyl-capped polyoxyalkylene derivatives and polyoxyethylene/polyoxypropylene copolymers.

An additional useful nonionic surfactant is nonylphenol having an average of 12 moles of ethylene oxide condensed thereon, it being end capped with a hydrophobic portion including an average of 30 moles of propylene oxide. Silicon-containing defoamers are also well-known and may be employed in the methods of the present invention.

Suitable amphoteric surfactants include, but are not limited to, amine oxide compounds having the formula:

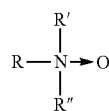

where R, R', R", and R'" are each a $C_1$-$C_{24}$ alkyl, aryl or arylalkyl group that may optionally contain one or more P, O, S or N heteroatoms.

Another class of suitable amphoteric surfactants includes betaine compounds having the formula:

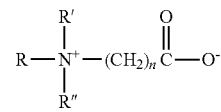

where R, R', R" and R'" are each a $C_1$-$C_{24}$ alkyl, aryl or aralkyl group that may optionally contain one or more P, O, S or N heteroatoms, and n is about 1 to about 10.

Suitable surfactants may also include food grade surfactants, linear alkylbenzene sulfonic acids and their salts, and ethylene oxide/propylene oxide derivatives sold under the Pluronic™ trade name. Suitable surfactants include those that are compatible as an indirect or direct food additive or substance.

Anionic surfactants suitable for use with the disclosed methods may also include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Exemplary anionics include, but are not limited to, sodium alkylarylsulfonate, alpha-olefin sulfonate, and fatty alcohol sulfates. Examples of suitable anionic surfactants include sodium dodecylbenzene sulfonic acid, potassium laureth-7 sulfate, and sodium tetradecenyl sulfonate.

In some embodiments, the surfactant includes linear alkyl benzene sulfonates, alcohol sulfonates, amine oxides, linear and branched alcohol ethoxylates, alkyl polyglucosides, alkyl phenol ethoxylates, polyethylene glycol esters, EO/PO block copolymers and combinations thereof.

In some embodiments, the amount of surfactant in the compositions is about 0.0001 wt % to about 1.0 wt %. Acceptable levels of surfactant include about 0.001 wt % to about 0.1 wt %, or about 0.002 wt % to about 0.05 wt %.

Surfactant Compositions

The surfactants described herein may be used singly or in combination in the methods of the present invention. In particular, the nonionics and anionics may be used in combination. The semi-polar nonionic, cationic, amphoteric and zwitterionic surfactants may be employed in combination with nonionics or anionics. The above examples are merely specific illustrations of the numerous surfactants which may find application within the scope of this invention. It should be understood that the selection of particular surfactants or combinations of surfactants may be based on a number of factors including compatibility with the surface to be cleaned at the intended use concentration and the intended environmental conditions including temperature and pH.

In addition, the level and degree of foaming under the conditions of use and in subsequent recovery of the composition may be a factor for selecting particular surfactants and mixtures of surfactants. For example, in certain applications it may be desirable to minimize foaming and a surfactant or mixture of surfactants that provides reduced foaming may be used. In addition, it may be desirable to select a surfactant or a mixture of surfactants that exhibits a foam that breaks down relatively quickly so that the composition may be recovered and reused with an acceptable amount of down time. In addition, the surfactant or mixture of surfactants may be selected depending upon the particular soil that is to be removed.

It should be understood that the compositions for use with the methods of the present invention need not include a surfactant or a surfactant mixture, and may include other components. In addition, the compositions may include a surfactant or surfactant mixture in combination with other components. Exemplary additional components that may be provided within the compositions used in the methods of the present invention include builders, water conditioning agents, non-aqueous components, adjuvants, carriers, processing aids, enzymes, and pH adjusting agents.

Builders

In some embodiments, compositions for use with the methods of the present invention include a builder or builders. Builders include chelating agents (chelators), sequestering agents (sequestrants), detergent builders, and the like. The builder often stabilizes the composition or solution. In some embodiments, builders suitable for use with the methods of the present invention preferably do not complex with the activator complex. That is, the builder or builders for use with the present invention are selected such that they preferentially complex with the mineral soil broken up after the oxygen gas has been generated in situ on and in the soil, rather than with the activator complex.

Builders and builder salts may be inorganic or organic. Examples of builders suitable for use with the methods of the present invention include, but are not limited to, phosphonic acids and phosphonates, phosphates, aminocarboxylates and their derivatives, pyrophosphates, polyphosphates, ethylenediamene and ethylenetriamene derivatives, hydroxyacids, and mono-, di-, and tri-carboxylates and their corresponding acids. Other builders include aluminosilicates, nitroloacetates and their derivatives, and mixtures thereof. Still other builders include aminocarboxylates, including salts of hydroxyethylenediaminetetraacetic acid (HEDTA), and diethylenetriaminepentaacetic acid.

Exemplary commercially available chelating agents for use with the methods of the present invention include, but are not limited to: sodium tripolyphosphate available from Innophos; Trilon A® available from BASF; Versene 100®, Low NTA Versene®, Versene Powder®, and Versenol 120® all available from Dow; Dissolvine D-40 available from BASF; and sodium citrate.

In some embodiments, a biodegradable aminocarboxylate or derivative thereof is present as a builder in the methods of the present invention. Exemplary biodegradable aminocarboxylates include, but are not limited to: Dissolvine GL-38® and Dissolvine GL-74 ® both available from Akzo; Trilon M® available from BASF; Baypure CX100® available from Bayer; Versene EDG® available from Dow; HIDS® available from Nippon Shakubai; Octaquest E30® and Octaquest A65® both available from Finetex/Innospec Octel.

In some embodiments, an organic chelating agent may be used. Organic chelating agents include both polymeric and small molecule chelating agents. Organic small molecule chelating agents are typically organocarboxylate compounds or organophosphate chelating agents. Polymeric chelating agents commonly include polyanionic compositions such as polyacrylic acid compounds. Small molecule organic chelating agents include N-hydroxyethylenediaminetriacetic acid (HEDTA), ethylenediaminetetraacetic acid (EDTA), nitrilotriacetic acid (NTA), diethylenetriaminepentaacetic acid (DTPA), ethylenediaminetetraproprionic acid triethylenetetraaminehexaacetic acid (TTHA), and the respective alkali metal, ammonium and substituted ammonium salts thereof. Aminophosphonates are also suitable for use as chelating agents with the methods of the invention and include ethylenediaminetetramethylene phosphonates, nitrilotrismethylene phosphonates, and diethylenetriamine-(pentamethylene phosphonate) for example. These aminophosphonates commonly contain alkyl or alkenyl groups with less than 8 carbon atoms.

Other suitable sequestrants include water soluble polycarboxylate polymers. Such homopolymeric and copolymeric chelating agents include polymeric compositions with pendant (—$CO_2H$) carboxylic acid groups and include polyacrylic acid, polymethacrylic acid, polymaleic acid, acrylic acid-methacrylic acid copolymers, acrylic-maleic copolymers, hydrolyzed polyacrylamide, hydrolyzed methacrylamide, hydrolyzed acrylamide-methacrylamide copolymers, hydrolyzed polyacrylonitrile, hydrolyzed polymethacrylonitrile, hydrolyzed acrylonitrile methacrylonitrile copolymers, or mixtures thereof. Water soluble salts or partial salts of these polymers or copolymers such as their respective alkali metal (for example, sodium or potassium) or ammonium salts may also be used. The weight average molecular weight of the polymers is from about 4000 to about 12,000. Preferred polymers include polyacrylic acid, the partial sodium salts of polyacrylic acid or sodium polyacrylate having an average molecular weight within the range of 4000 to 8000.

Preferred builders for use with the methods of the present invention are water soluble. Water soluble inorganic alkaline builder salts which may be used alone or in admixture with other builders include, but are not limited to, alkali metal or ammonia or substituted ammonium salts of carbonates, silicates, phosphates and polyphosphates, and borates. Water soluble organic alkaline builders which are useful in the present invention include alkanolamines and cyclic amines.

Particularly preferred builders include PAA (polyacrylic acid) and its salts, phosphonobutane carboxylic acid, HEDP (1-Hydroxyethylidene-1,1-Diphosphonic Acid), EDTA and sodium gluconate.

In some embodiments, the amount of builder present in the compositions for use with the methods of the present invention is about 0.001 wt % to about 5 wt %. In some embodiments, about 0.005 wt % to about 0.1 wt % of builder is present. Acceptable levels of builder include about 0.05 wt % to about 2.5 wt %.

Optional Adjuvants

In addition, various other additives or adjuvants may be present in compositions of the present invention to provide additional desired properties, either of form, functional or aesthetic nature, for example:

a) Solubilizing intermediaries called hydrotropes may be present in the compositions of the invention of such as xylene-, toluene-, or cumene sulfonate; or n-octane sulfonate; or their sodium-, potassium- or ammonium salts or as salts of organic ammonium bases. Also commonly used are polyols containing only carbon, hydrogen and oxygen atoms. They preferably contain from about 2 to about 6 carbon atoms and from about 2 to about 6 hydroxy groups. Examples include 1,2-propanediol, 1,2-butanediol, hexylene glycol, glycerol, sorbitol, mannitol, and glucose.

b) Nonaqueous liquid carriers or solvents may be used for varying compositions of the present invention.

c) Viscosity modifiers may be added to the compositions of the present invention. These may include natural polysaccharides such as xanthan gum, carrageenan and the like; or cellulosic type thickeners such as carboxymethyl cellulose, and hydroxymethyl-, hydroxyethyl-, and hydroxypropyl cellulose; or, polycarboxylate thickeners such as high molecular weight polyacrylates or carboxyvinyl polymers and copolymers; or, naturally occurring and synthetic clays; and finely divided fumed or precipitated silica, to list a few. In some embodiments, the compositions for use with the methods of the present invention do not include a gelling agent.

d) Solidifiers may be used to prepare solid forms of compositions of the present invention. These could include any organic or inorganic solid compound having a neutral inert character or making a functional, stabilizing or detersive contribution to the intended embodiment. Examples are polyethylene glycols or polypropylene glycols having molecular weight of from about 1,400 to about 30,000; and urea.

Methods of Cleaning

In some aspects, the present invention provides methods for removing soil from a surface. In some embodiments, the methods for removing soil from a surface include using a clean in place cleaning process. The methods include applying to the surface a composition including at least one of an activator complex, a source of alkalinity, and an active oxygen source. Additional ingredients may also be present in the compositions. The activator complex, source of alkalinity, and active oxygen source may be applied to the surface in a variety of ways. For example, the activator complex, source of alkalinity, and active oxygen source may be applied to the surface as part of a single composition.

In other embodiments, the activator complex, source of alkalinity, and active oxygen source may be applied in a stepwise manner, e.g., one after the other, without a rinse step in between application of each of the components.

In other embodiments, combinations of each of the components may be applied to the surface. For example, in some embodiments, the activator complex and active oxygen source are applied in a first step, and the source of alkalinity is applied in a second step, without a rinse step between the first and the second steps. Additional ingredients including, but not limited to, builders, surfactants, and chelating agents may be added to the compositions used in the first step, the second step, or both the first and the second steps. The composition of the first step may be applied to the surface for an amount of time effective to penetrate the soil. For example, the first step may be applied to the surface to be cleaned for between about 5 to about 15 minutes.

In other embodiments, an active oxygen source and a source of alkalinity are applied to the surface in a first step, and an activator complex is applied to the surface in second step, without a rinse step between the first and the second steps. Exemplary cleaning methods and compositions are shown in the table below.

|  | Cleaning step | Composition (wt %) |
|---|---|---|
| Exemplary Method 1 | Pretreatment for 5-15 minutes | 0.01% to 1.0% active oxygen source<br>0.001% to 0.1% activator complex<br>0.002% to 0.05% surfactant |
|  | Override step | 0.1% to 3.0% source of alkalinity<br>0.0001% to 0.1% builder<br>0.0001% to 0.1% chelating agent |
| Exemplary Method 2 | Apply composition to surface at 15° C. to 40° C. | 0.5% to 1.5% source of alkalinity<br>0.25% to 1.0% active oxygen source<br>0.005% to 0.02% activator complex<br>0.001% to 0.1% surfactant<br>0.0001% to 0.1% builder<br>0.0001% to 0.1% chelating agent |

An exemplary composition of the present invention is also shown in the table below.

| Ingredient | Concentration (wt %) |
|---|---|
| Source of alkalinity | 0.1 to 1.0 |
| Active oxygen source | 0.1 to 5.0 |
| Surfactant | 0.001 to 0.1 |
| Builder | 0.0001 to 0.1 |
| Chelating agent | 0.0001 to 0.1 |

In some embodiments, the activator complex is added to this composition. In other embodiments, the activator complex is applied to the surface before, after, or at substantially the same time as this composition is applied to the surface.

In some embodiments, the methods of the present invention are followed by only a rinse step. The methods of the present invention do not require rinse steps in between application of the components of the compositions of the present invention. That is, when the activator complex, source of alkalinity, and active oxygen source are applied to a surface in a step-wise manner, the surface does not need to be rinsed in between each application step. Thus, the methods of the present invention provide for enhanced cleaning, while consuming less water than conventional clean in place cleaning techniques.

In other embodiments, the methods of the present invention are followed by a conventional CIP method suitable for the surface to be cleaned. In still yet other embodiments, the methods of the present invention are followed by a CIP method such as those described in U.S. patent application Ser. Nos. 10/928,774 and 11/257,874 entitled "Methods for Cleaning Industrial Equipment with Pre-treatment," both of which are hereby incorporated by reference in their entirety.

In some embodiments, the methods of the present invention further include reapplying the composition of the present invention to a surface or system to be cleaned, after the composition has already been applied to a surface in a first cleaning step. The composition may be reapplied to the same surface, or to a different surface, than the surface that has already been cleaned in the first cleaning step. For example, a composition of the present invention can be applied to a surface to be cleaned. After application, the used composition is collected, and reapplied to a surface to be cleaned, e.g., the same or a different surface than that surface which has already been cleaned. Additional, unused active oxygen source may be added to the used composition to re-activate the composition, producing oxygen gas. The additional unused active oxygen source may be added to the composition at any time, i.e., before, during or after the composition has been reapplied to the surface.

Compositions of the present invention may be reused for extended periods of time, viz. for multiple washes. The amount of time the compositions may be reused for is dependent on a variety of factors, including for example, the soil level in the composition after each cleaning cycle. For example, in some embodiments, compositions of the present invention may be reused for between about 3 to about 10 days. In other embodiments, the compositions of the present invention may be reused for about 7 days.

In some embodiments, the compositions for use with the methods of the present invention include ingredients that are characterized by the United States Food and Drug Administration as direct or indirect food additives. In some embodiments, the compositions include ingredients that are generally recognized as safe (GRAS) for direct food contact.

In some embodiments, the compositions for use with the present invention are substantially free of chlorine or chlorine containing compounds. As used herein, the term "substantially free of chlorine or chlorine containing compounds" refers to a composition, mixture, or ingredients that does not contain chlorine or to which only a limited amount of chlorine has been added. Should chlorine be present, the amount of chlorine shall be less than about 1 wt %, less than about 0.5 wt %, or less than about 0.1 wt %.

Surfaces

In some embodiments, the methods and compositions of the present invention are applied to surfaces which are normally cleaned using a clean in place cleaning technique. Examples of such surfaces include evaporators, heat exchangers (including tube-in-tube exchangers, direct steam injection, and plate-in-frame exchangers), heating coils (including steam, flame or heat transfer fluid heated) re-crystallizers, pan crystallizers, spray dryers, drum dryers, and tanks.

Additional surfaces capable of being cleaned using the methods and compositions of the present invention include, but are not limited to membranes, medical devices, laundry and/or textiles, and hard surfaces, e.g., walls, floors, dishes, flatware, pots and pans, heat exchange coils, ovens, fryers, smoke houses, sewer drain lines, and vehicles. In some embodiments, the surfaces may be cleaned using a clean in place method. In other embodiments, the surfaces may be cleaned using a non-CIP method. The methods of the present invention may also be used to remove dust from air handling equipment, for example, from air conditioners and refrigeration heat exchangers. In other embodiments, the methods of the present invention may be used for drain line microbial control, e.g., to reduce or remove biofilm formation.

Exemplary industries in which the methods and compositions of the present invention may be used include, but are not limited to: the food and beverage industry, e.g., the dairy, cheese, sugar, and brewery industries; oil processing industry; industrial agriculture and ethanol processing; and the pharmaceutical manufacturing industry.

Temperature

The methods and compositions of the present invention provide for soil removal from surfaces at reduced temperatures, e.g., from about 5° C. to about 50° C., compared to conventional cleaning techniques, e.g., clean in place techniques. In some embodiments, the methods of the present invention provide for soil removal from surfaces at an ambient or room temperature, e.g., about 18° C. to about 23° C. Without wishing to be bound by any particular theory, it is thought that the use of an activator complex in conjunction with an active oxygen source and a source of alkalinity allows for the generation of oxygen gas on and in a soil, without the use of heat activation.

The ability to clean at reduced temperatures results in energy and cost savings compared to traditional cleaning techniques that require increased temperatures. Further, the present invention provides for effective soil removal on surfaces that cannot withstand high temperatures.

It has also been found that the methods of the present invention provide for soil removal at reduced temperatures, and using reduced amounts of chemistry, compared to conventional cleaning methods, e.g., CIP cleaning methods. In some embodiments, the methods of the present invention use about 25% to about 50% less chemistry, e.g., source of alkalinity and/or active oxygen source, than conventional cleaning methods. Thus, the methods of the present invention may effectively remove soil at both low temperatures, and using a low concentration of chemicals, providing both an energy savings and a reduction in the amount of chemistry consumed per cleaning.

Time

In some aspects of the invention, the compositions for use with the methods of the present invention are applied to the surface for a sufficient amount of time such that the composition penetrates into the soil to be removed. This penetration into the soil allows for oxygen gas generation to occur in the soil. Although the methods of the present invention are carried out at lower temperatures than conventional cleaning methods, an increased cleaning time is not required to achieve equal or better cleaning results than conventional cleaning methods.

In some aspects, a composition including at least one of an activator complex, an active oxygen source, and a source of alkalinity is applied to a surface for an amount of time sufficient to substantially remove a soil from the surface. In some embodiments, the composition is applied to the surface for about 10 minutes to about 60 minutes. In other embodiments, the composition is applied to the surface for about 20 to about 40 minutes. It is to be understood that all values and ranges between these values and ranges are encompassed by the methods of the present invention.

In some aspects, a pre-treatment solution including at least one of an activator complex, an active oxygen source, and a source of alkalinity, is applied to the surface for an amount of time sufficient to substantially penetrate a soil on the surface. In some embodiments, the pre-treatment solution is applied to the surface to be cleaned for about 1 to about 30 minutes. In some embodiments, the pretreatment solution is applied to the surface to be cleaned for about 5 to about 15 minutes. In some embodiments, the pre-treatment solution is applied to the surface for about 10 minutes. It is to be understood that any value between these ranges is to be encompassed by the methods of the present invention.

In some aspects of the present invention, an override solution including at least one of an activator complex, an active oxygen source, and a source of alkalinity, is applied to a surface to be cleaned after a pre-treatment solution has been applied to the surface, i.e., there is no rinse step between the application of the pre-treatment solution and the override solution. In some embodiments, the override solution is applied to the surface for an amount of time sufficient to effectively clean the selected surface, and to activate the pre-treatment chemistry, e.g., generate oxygen gas. In some embodiments, the override solution is applied for about 1 to about 30 minutes. In some embodiments, the override use solution is applied for about 5, about 10, or about 15 minutes. It is to be understood that all values and ranges between these values and rages are encompassed by the methods of the present invention.

EXAMPLES

The present invention is more particularly described in the following examples that are intended as illustrations only. Unless otherwise noted, all parts, percentages, and ratios reported in the following examples are on a weight basis, and all reagents used in the examples were obtained, or are available, from the chemical suppliers described below, or may be synthesized by conventional techniques.

Example 1—Dairy Soil Removal Test

This experiment was run to determine the ability of the methods of the present invention to remove dairy soils from stainless steel surfaces. For this test, 316 stainless steel coupons (5 cm×10 cm) were first cleaned and dried. 5 milliliters of condensed milk was applied to a rectangular area on the lower ⅔ of the coupons and allowed to dry for 24 hours. The soiled coupons were then used in two different tests: a beaker test, and a Cold Dairy Soil Test. The following solutions were prepared: (1) a 1% sodium hydroxide solution; (2) a mixture of 1% sodium hydroxide and 1% hydrogen peroxide; and (3) 1% hydrogen peroxide, and 100 ppm activator complex (Mn catalyst), followed by a 1% sodium hydroxide override solution after 2 minutes.

For the Beaker Test, 750 milliliters of test solutions 1 and 3 were prepared at 110° F. and placed on a stirring hot plate, with 350 rpm of stir bar agitation. The soiled coupons were placed into the beakers until one of the coupons appeared cleaned. The coupons were then removed from the beakers and photographed.

For the Cold Dairy Soil Test, 100 milliliters of each of the three test solutions were prepared at 95° F. and placed into a dip tester. The soiled coupons were hung above the solutions so that they would be completely submerged in the solutions during the test. The coupons were then cycled in and out of the solutions at a rate of 18 cycles per minute until one of the samples appeared cleaned. All of the coupons were cleaned for a total of 8 minutes. The coupons were then photographed.

The results of the beaker test are shown in FIG. 1. The coupons labeled 11, and 14 were cleaned using test solution 3 (1% hydrogen peroxide, and 100 ppm activator complex (Mn catalyst), followed by a 1% sodium hydroxide override solution after 2 minutes). The coupons labeled 12 and 13 were cleaned using test solution 1 (1% sodium hydroxide solution). As can be seen in FIG. 1, those coupons cleaned using the alkaline peroxide with catalyst solution (coupons 11 and 14) showed improved cleaning compared to those coupons cleaned using the caustic solution (coupons 12 and 13).

Figure 2:
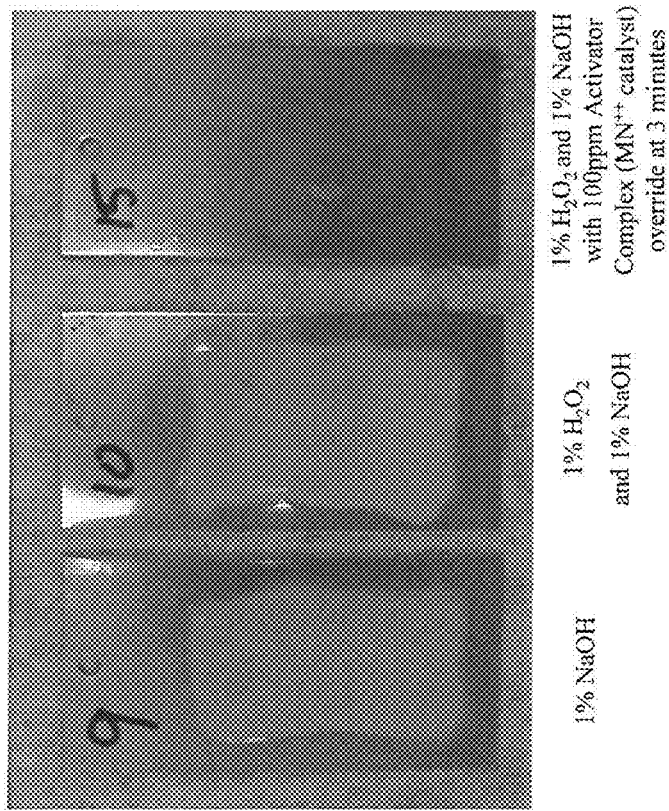
FIG. 2 is a photograph illustrating stainless steel panels after cleaning as described in Example 1.

The results of the Cold Dairy Soil Test are shown in FIG. 2. The coupon labeled 9 was cleaned using test solution 1, the coupon labeled 10 was cleaned using test solution 2, and the coupon labeled 15 was cleaned using the same components of test solution 3 (above) but in the following order: 1% hydrogen peroxide and 1% sodium hydroxide, followed by a 100 ppm activator complex (Mn catalyst) override solution after 3 minutes. The lighter areas shown on the coupons are the soils that remained on the coupons after testing. As can be seen in FIG. 2, coupon 15, cleaned with the alkaline peroxide catalyst system (test solution 3), showed improved cleaning when compared to the other solutions tested. Coupon 15 had substantially all of the soil removed, whereas coupons 9 and 10 appeared to have less than 25% of the soil removed after cleaning.

Example 2—Brewery Mash Soil Removal Test

This experiment was run to determine the ability of the methods of the present invention to remove brewery mash soils from stainless steel surfaces. The trays were soiled using the following technique. Whole dried barley was added to boiling water. The barley/water mixture was removed from the heat, stirred, and allowed to sit for at least 1 hour. The mixture was then refrigerated overnight. 750 grams of the mixture was then placed in a large capacity blender with 100 milliliters of water, and blended on low until a fairly homogenous slurry was formed. Then, 25 grams of the slurry was placed into a clean stainless steel tray and distributed evenly across the surface of the tray. The tray was then placed into an oven at 80-85° C. and baked for 3-5 hours.

The following test solutions were prepared: (1) 0.75 wt % sodium hydroxide, 0.4 wt % hydrogen peroxide, and 100 ppm manganese sulfate as an activator complex (the "LT-CIP" solution); (2) 1.0 wt % sodium hydroxide solution; (3) 1 wt % nitric acid solution. The soiled trays were placed into 1000 milliliter beakers containing 1000 milliliters of one of the test solutions. The test solutions were tested at 20° C. and at 40° C. The soiled trays were placed into the cleaning solutions for 30 minutes. At the end of 30 minutes, the treated trays were carefully removed, weighed, and photographed. The results are shown in the tables below.

TABLE 1

Test Results at 20° C. Cleaning

| Test Solution | Temperature | Starting Weight (grams) | Final Weight (grams) | Tray Weight (grams) | Percent Soil Removal (%) | Average Soil Removal per Test Solution |
|---|---|---|---|---|---|---|
| LT-CIP | 20° C. | 154.7 | 133.3 | 127.2 | 77.78% | 73.42% |
| LT-CIP | 20° C. | 154.8 | 132.9 | 127.3 | 79.49% | |
| LT-CIP | 20° C. | 154.09 | 136.8 | 126.6 | 62.98% | |
| NaOH (1%) | 20° C. | 153.85 | 149 | 126.4 | 17.60% | 10.48% |
| NaOH (1%) | 20° C. | 154.26 | 154.3 | 126.8 | 0.04% | |
| NaOH (1%) | 20° C. | 154.8 | 151.0 | 127.3 | 13.82% | |
| Nitric Acid (1%) | 20° C. | 153.95 | 142.8 | 126.5 | 40.51% | 37.35% |
| Nitric Acid (1%) | 20° C. | 154.94 | 144.4 | 127.4 | 38.33% | |
| Nitric Acid (1%) | 20° C. | 154.8 | 145.7 | 127.3 | 33.20% | |

TABLE 2

Test Results at 40° C.

| Test Solution | Temperature | Starting Weight (grams) | Final Weight (grams) | Tray Weight (grams) | Percent Soil Removal (%) | Average Soil Removal per Test Solution |
|---|---|---|---|---|---|---|
| LT-CIP | 40° C. | 153.9 | 132.3 | 126.4 | 78.62% | 80.55% |
| LT-CIP | 40° C. | 154.94 | 133.2 | 127.4 | 79.24% | |
| LT-CIP | 40° C. | 154.26 | 131.2 | 126.8 | 83.78% | |
| NaOH (1%) | 40° C. | 153.92 | 154.3 | 126.4 | −1.27% | 1.21% |
| NaOH (1%) | 40° C. | 154.8 | 153.8 | 127.3 | 3.82% | |
| NaOH (1%) | 40° C. | 153.95 | 153.7 | 126.5 | 1.09% | |
| Nitric Acid (1%) | 40° C. | 154.8 | 148.1 | 127.3 | 24.55% | 24.65% |
| Nitric Acid (1%) | 40° C. | 154.09 | 147.1 | 126.6 | 25.42% | |
| Nitric Acid (1%) | 40° C. | 153.85 | 147.3 | 126.4 | 24.00% | |

Figure 3:
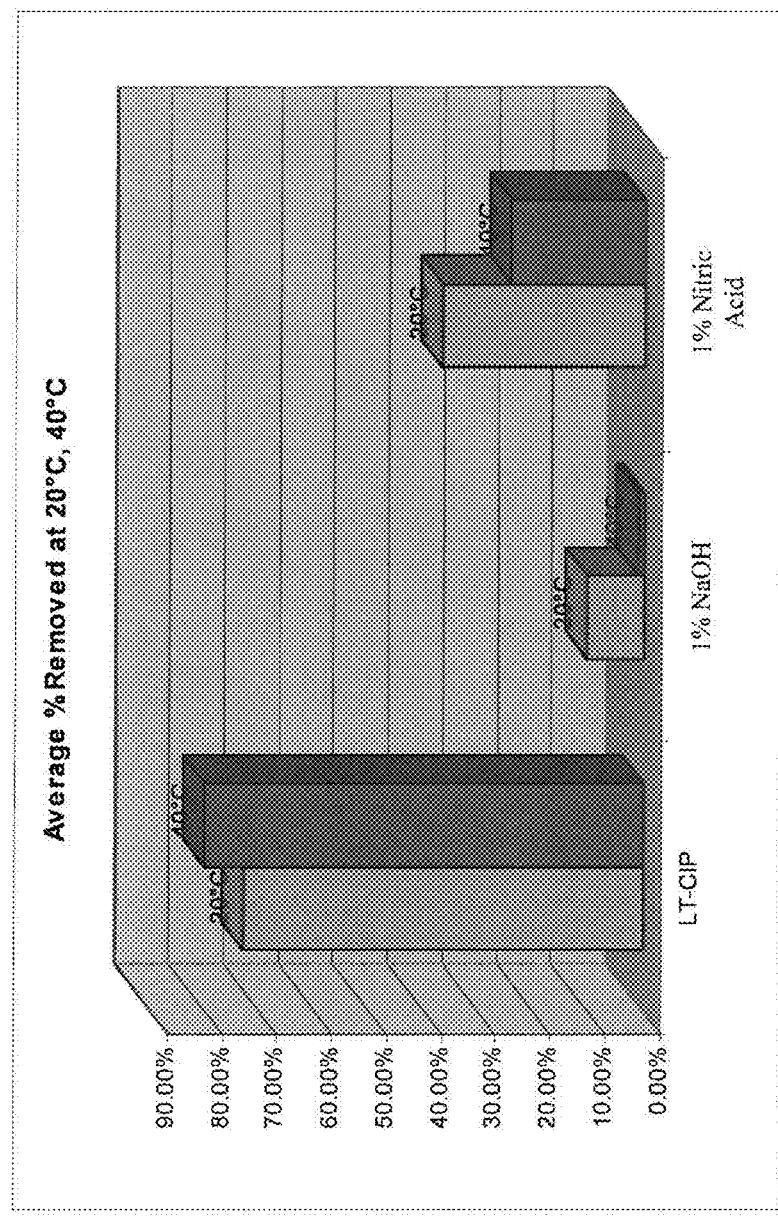
FIG. 3 is a graphical depiction of the average percent soil removal achieved at 20° C. and 40° using various cleaning methods.

These results are also graphically depicted in FIG. 3. As can be seen from the above tables, and FIG. 3, the trays treated with the LT-CIP cleaning solutions had a much higher soil removal rate than those trays treated with the caustic or acid alone treatments.

Example 3—Low Temperature and Reduced Cleaning Chemistry Soil Removal Test

A test was run to determine the difference between a heat activated CIP cleaning method, and an exemplary low temperature, reduced cleaning chemistry CIP cleaning method of the present invention. Trays were soiled with brewery mash soil as described above in Example 2. Two different cleaning methods were compared.

In the first cleaning method (method A), a soiled tray was placed in a 1000 milliliter beaker with a pretreatment solution of 0.5 wt % hydrogen peroxide, and 100 ppm of an activator complex (manganese sulfate). After ten minutes, an alkaline override solution of 0.75 wt % sodium hydroxide was added to the beaker.

In the second cleaning method (method B), a soiled tray was placed in a 1000 milliliter beaker with a 1.0% solution of an acidic pretreatment that included 74% hydrogen peroxide (35%) as the active oxygen source, and had no activator complex. After ten minutes, an alkaline override solution of 1.5% sodium hydroxide was added to the beaker.

Both of the cleaning methods were applied to the soiled trays for a total cleaning time of 30 minutes. The trays were then removed from the beakers, photographed, and weighed.

The results from this test are shown in the table below.

TABLE 3

|  | Method A | Method B |
| --- | --- | --- |
| Original Weight (grams) | 156.45 | 157.54 |
| Tray Weight (grams) | 126.45 | 127.44 |
| Final Weight (grams) | 132.97 | 154.98 |
| Percent Soil Removed (%) | 78.27% | 8.20% |

Figure 4:
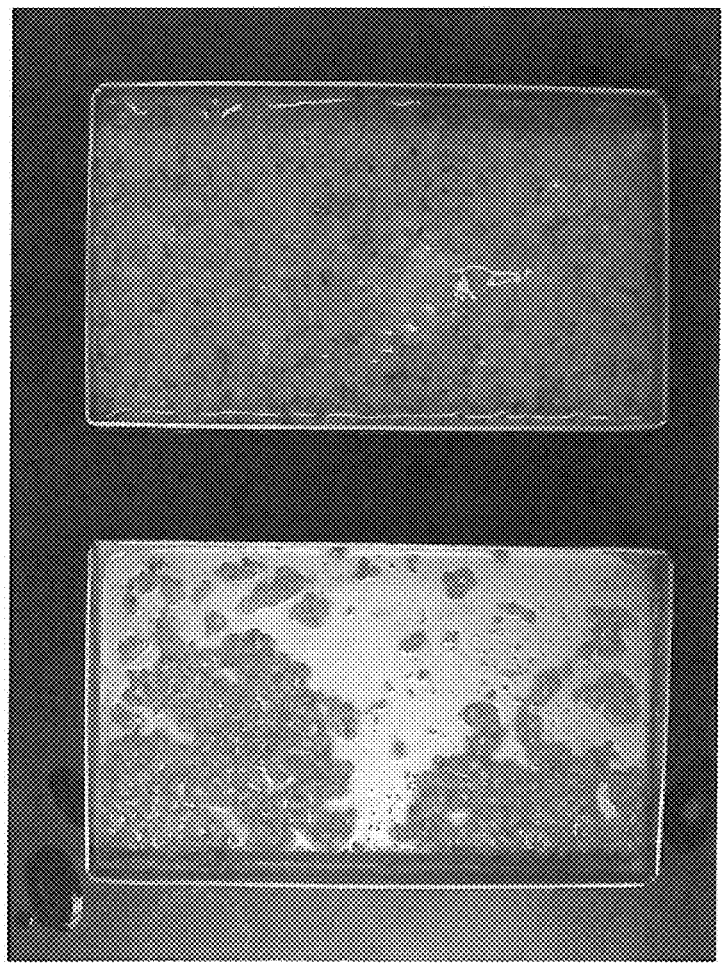
FIG. 4 is a photograph illustrating stainless steel trays after cleaning as described in Example 3.

These results are also shown in FIG. 4. In FIG. 4, the tray cleaned using method A (the tray on the left) shows improved cleaning compared to the tray cleaned using method B (the tray on the right). The darker areas of the trays indicate remaining soil. The lighter areas are the tray itself, indicating soil removal in that area.

As can be seen from the results in Table 3, and FIG. 4, the trays cleaned using an exemplary method of the present invention, method A, showed a dramatic increase in soil removal compared to a comparative test method, method B. The increased soil removal was also achieved using 50% less cleaning chemistry than that used in the comparative method. Overall, the exemplary cleaning method of the present invention provided 70% more soil removal using half of the chemistry of the comparative chemistry.

To show that the activator complex is essential to driving soil removal at a reduced temperature, 100 ppm of the activator complex (manganese sulfate) was added to the beaker used in method B after the tray was removed. It was observed that the solution immediately began to bubble. Foam also accumulated on the top of the solution. Bubbling and foaming was not observed during the test of method B without the catalyst present.

Example 4—Stability Study

Three separate formulas were tested to determine the stability of both the concentrated formula, and the use solutions. The three formulas tested were as follows:

TABLE 4

| Ingredient | Formula A Amount present in concentrate (wt %) | Formula B Amount present in concentrate (wt %) | Formula C Amount present in concentrate (wt %) |
| --- | --- | --- | --- |
| Water | 42.0 | 49.65 | 45.40 |
| Manganese Sulfate Monohydrate | 0.35 | 0.35 | 0.35 |
| Sodium Gluconate (60%) | 4.0 | — | 4.0 |
| Hydrogen Peroxide (35%) | 0.25 | — | 0.25 |
| Acusol 445N | 2.0 | — | — |
| Dequest 2010 | 1.4 | — | — |
| Sodium Hydroxide (50%) | 50.0 | 50.0 | 50.0 |

Each of the formulas A, B, and C, were prepared separately as concentrates and allowed to sit for 48 hours. They were then prepared as 0.5% use solutions with 1000 ppm additional hydrogen peroxide added in zeolite softened water at 20° C. The formulas were then allowed to react for 24 hours. The formulas were observed for the formation of precipitates. The results are shown in the table below.

TABLE 5

| Formula | Precipitate Present Concentrate | Precipitate Present Use Solution |
| --- | --- | --- |
| A | No | No |
| B | Yes | Yes |
| C | No | Yes |

As can be seen from these results, Formula A was both stable as a concentrate and as a use solution. The concentrate is stable in that the manganese is held in solution and does not precipitate out. Without wishing to be bound by any particular theory, it is thought that the combination of the manganese sulfate monohydrate and the sodium gluconate results in an alkaline stable transition metal complex. This alkaline stable transition metal complex was present in both Formulas A and C, but not B. The formation of a precipitate was observed in Formula B.

It was also observed that only Formula A did not form a precipitate as a use solution. Without wishing to be bound by any particular theory, it is thought that the addition of a builder (Acusol 445N) and a chelating agent (Dequest 2010) are at least partially responsible for this lack of precipitate formation. Formula A was the only formula tested that included both a chelating agent and a builder.

Example 5—Comparative Study

A study was run to compare the compositions of the present invention to a known detergent bleach composition that includes a manganese bleach catalyst, as described in EP Patent No. 0237811B1. The comparative formula was prepared as follows. 0.338 g of manganese sulfate and 21.8 g of sodium gluconate were dissolved in 500 ml of doubly distilled water. Then, 2 ml of 1N sodium hydroxide was added to raise the pH to 10. The solution was then placed on a rotary evaporated to remove the water. The resulting mixture was freeze-dried to a powder. This powder was used as a catalyst mixture in the following detergent bleach formulation.

TABLE 6

| Comparative Formula | |
| --- | --- |
| Component | % by weight |
| Surfactant | 6.4 |
| Sodium carbonate | 25.0 |
| Sodium silicate | 7.5 |
| Sodium hydroxide | 0.5 |
| Sodium sulphate | 29.0 |
| Sodium perborate monohydrate | 20.0 |
| Catalyst | 10.0 |
| Water | Remainder to 100% |

An exemplary composition of the present invention, Formula A, was prepared as follows. An aqueous activator complex including alkaline stable transition metal complex was prepared as follows. Water, an activator complex, viz. manganese sulfate, and sodium gluconate (60%) were mixed until all of the solids were dissolved. This alkaline stable transition metal complex was then combined with an active oxygen source, a surfactant, a chelating agent, and a source of alkalinity. The components of the final reaction product, Formula 1, are shown in the table below.

TABLE 7

| Formula 1 | |
| --- | --- |
| Component | % by weight |
| Water | 67.25 |
| Chelating Agent | 1.4 |
| Builder | 2.00 |
| Source of Alkalinity | 25.0 |
| Activator Complex | 4.35 |

This mixture was then combined at a dilution ratio of 3 g/L water with the following mixture, Formula 2, also diluted at a ratio of 3 g/L water.

TABLE 8

| Formula 2 | |
| --- | --- |
| Component | % by weight |
| Active Oxygen Source | 75.30 |
| Deionized water | 14.74 |
| Chelating Agent | 0.75 |
| Surfactant | 2.00 |
| Hydrotrope | 7.21 |

This combined solution, i.e., the diluted combination of Formulas 1 and 2, was the Formula A use solution. The Comparative Formula was diluted at ratio of 2 g/L water to form the use solution. The surfactant used in Formula 2 was the same surfactant as used in the Comparative Formula.

Barley mash test coupons were prepared as described above in Example 2. The trays were weighed prior to treatment. Each tray weighed 125 g prior to soiling. Ten grams of soil was added to each tray, making a combined soil/tray weight of 135 g before cleaning.

The trays were then placed in 1000 ml beakers with 900 ml of one of the use solutions (either the use solution including Formula A, or the use solution including Comparative Formula 1). The trays were placed in the beakers with stirring for 15 minutes at 40° C. After 15 minutes, the trays were removed from the beakers and allowed to dry at room temperature for two days. The trays and the remaining soil were both weighed. The results are shown in the table below.

TABLE 8

| Formula Tested | Soil/Tray Weight Before Treatment (g) | Soil/Tray Weight After Treatment (g) | Soil Weight After Treatment (g) | Soil Removed (%) |
| --- | --- | --- | --- | --- |
| Formula A | 135 | 128 | 3 | 70 |
| Comparative Formula 1 | 135 | 134 | 9 | 10 |

Figure 5:
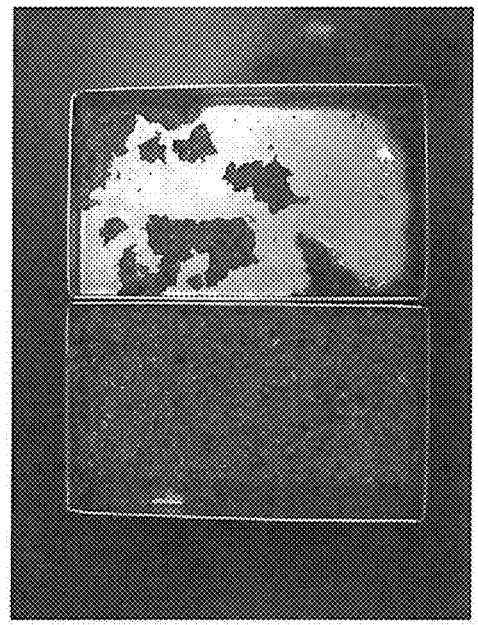
FIG. 5 is a photograph illustrating stainless steel trays before and after cleaning as described in Example 5.
Figure 5:
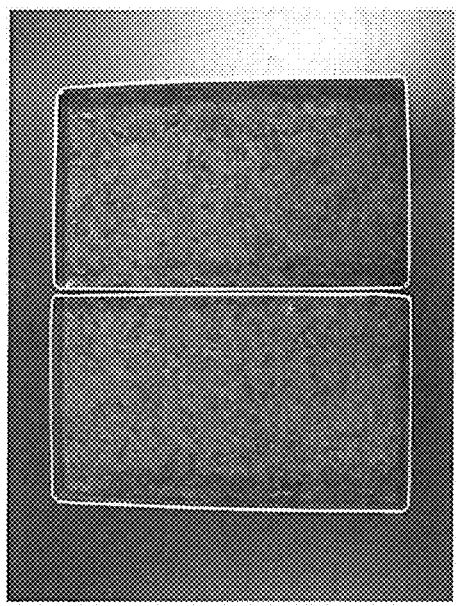

These results are also shown in FIG. 5. The dark areas in these photographs represent the remaining soil. The lighter areas are the areas where the soil has been removed, and the stainless steel surface of the tray is showing. As can be seen in this figure, the tray cleaned using Comparative Formula 1, had most of the surface still covered by soil after cleaning. The tray cleaned using exemplary Formula A of the present invention had about 70% of the soil removed.

Overall, it was shown that cleaning using the exemplary formula of the present invention using an aqueous alkaline stable activator complex, in combination with an active oxygen source, results in a far greater amount of soil removal on a hard surface, than when using the comparative detergent bleach composition. Without wishing to be bound by any particular theory, it is thought that the combination of the aqueous alkaline stable activator complex with an active oxygen source results in the generation of oxygen gas on and in the soil on the treated surface. It is thought that this gas generation is due to the degeneration of the active oxygen source by the activator complex. This oxygen gas generation results in enhanced soil removal compared to conventional detergent formulations that inhibit the decomposition of any active oxygen sources present.

Other Embodiments

It is to be understood that while the invention has been described in conjunction with the detailed description thereof, the foregoing description is intended to illustrate, and not limit the scope of the invention, which is defined by the scope of the appended claims. Other aspects, advantages, and modifications are within the scope of the following claims.

In addition, the contents of all patent publications discussed supra are incorporated in their entirety by this reference.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

We claim:

1. A method for removing soil from a surface in an industrial process, comprising:
   (i) applying a pre-treatment solution to a soiled surface for about 5 to about 15 minutes at a temperature of between about 5 to about 23 degrees C. in a clean in place process, the pre-treatment solution comprising:
      an active oxygen source, and
      0.1-10 wt % activator complex comprising Fe gluconate or Mn gluconate; and thereafter
   (ii) applying an override solution comprising 10-30 wt % alkali metal hydroxide to the soiled surface, wherein there is no rinse step between application of the pre-treatment solution and the override solution, wherein the activator complex catalyzes the production of oxygen gas that mechanically breaks up soils on the surface.

2. The method of claim 1, wherein the alkali metal hydroxide comprises sodium hydroxide.

3. The method of claim 1, wherein the active oxygen source comprises a peroxygen compound.

4. The method of claim 3, wherein the peroxygen compound comprises hydrogen peroxide.

5. The method of claim 1, wherein the pre-treatment solution further comprises an additional functional ingredient selected from the group consisting of a low foam surfactant, a builder, a buffer, an antimicrobial composition, and combinations thereof.

6. The method of claim 5, wherein the surfactant is selected from the group consisting of alcohol alkoxylates, linear alkyl benzene sulfonates, alcohol sulfonates amine oxides, alkyl phenol ethoxylates, polyethylene glycol esters, EO/PO block copolymers and mixtures thereof.

7. The method of claim 1, wherein the pre-treatment solution comprises:
   (i) about 10 to about 500 parts per million Fe gluconate; and
   (ii) about 0.25 wt % to about 1.0 wt % peroxygen compound.

8. A method for cleaning a surface comprising:
   applying a pre-treatment solution to the surface for about 5 to about 15 minutes at a temperature of between about 5° C. to about 23° C., wherein the pre-treatment solution comprises:
   (a) an active oxygen source comprising a peroxygen compound, and
   (b) a source of alkalinity selected from the group consisting of basic salts, amines, alkanol amines, carbonates, silicates and mixtures thereof; and thereafter
   (ii) applying an override solution to the surface at a temperature of between about 5° C. to about 23° C., wherein there is no rinse step between the application of the pre-treatment solution and the override solution, wherein the override solution comprises an activator complex comprising Fe gluconate or Mn gluconate.

9. The method of claim 8, wherein the activator complex comprises is Fe gluconate.

10. The method of claim 9, wherein the peroxygen compound comprises hydrogen peroxide.

11. The method of claim 9, wherein the source of alkalinity comprises an alkali metal hydroxide.

12. The method of claim 9, wherein the pre-treatment solution further comprises a surfactant.

13. The method of claim 12, wherein the surfactant is selected from the group consisting of alcohol alkoxylates, linear alkyl benzene sulfonates, alcohol sulfonates amine oxides, alkyl phenol ethoxylates, polyethylene glycol esters, EO/PO block copolymers and mixtures thereof.

14. The method of claim 9, wherein the pre-treatment solution and the override solution comprise generally recognized as safe (GRAS) ingredients.

15. The method of claim 9, wherein the active oxygen source is present at from about 0.01 wt-% to 1.0 wt-% of the pre-treatment solution and the source of alkalinity is present at from about 0.1 wt-% to 3.0 wt-% of the pre-treatment solution.

16. The method of claim 9, wherein the activator complex is present at from about 0.001 wt-% to about 0.1 wt-% of the override solution.

* * * * *

UNITED STATES PATENT AND TRADEMARK OFFICE
CERTIFICATE OF CORRECTION

PATENT NO. : 10,260,025 B2
APPLICATION NO. : 14/973102
DATED : April 16, 2019
INVENTOR(S) : Erickson et al.

Page 1 of 1

It is certified that error appears in the above-identified patent and that said Letters Patent is hereby corrected as shown below:

In the Claims

Column 27, Line 28, Claim 8: before "applying" insert --(i)--

Column 28, Line 11, Claim 9: "comprises is Fe" should read --comprises Fe--

Signed and Sealed this
Twenty-first Day of April, 2020

Andrei Iancu
*Director of the United States Patent and Trademark Office*